(12) United States Patent
Dobashi (10) Patent No.: US 7,050,608 B2
(45) Date of Patent: May 23, 2006

(54) FACE IMAGE RECOGNITION APPARATUS

(75) Inventor: Hironori Dobashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 555 days.

(21) Appl. No.: 10/091,569

(22) Filed: Mar. 7, 2002

(65) Prior Publication Data

US 2002/0126880 A1 Sep. 12, 2002

(30) Foreign Application Priority Data

Mar. 9, 2001 (JP) .............................. 2001-067235

(51) Int. Cl.
*G06K 9/00* (2006.01)
(52) U.S. Cl. .......................... 382/118; 340/5.83; 902/3
(58) Field of Classification Search ................ 382/115, 382/118
See application file for complete search history.

(56) References Cited

U.S. PATENT DOCUMENTS

| 5,550,928 A | 8/1996 | Lu et al. |
| 6,111,517 A | 8/2000 | Atick et al. |

FOREIGN PATENT DOCUMENTS

| JP | 10-134188 | 5/1988 |
| JP | 7-312711 | 11/1995 |
| JP | 11-167632 | 6/1999 |
| JP | 11-176718 | 7/1999 |
| JP | 11-191856 | 7/1999 |
| JP | 11-316836 | 11/1999 |
| WO | WO 91/08555 | 6/1991 |
| WO | WO 98/50880 | 11/1998 |
| WO | WO 00/10116 | 2/2000 |

OTHER PUBLICATIONS

Kazuhiro Fukui et al., "Facial Feature Point Extraction Method Based on Combination of Shape Extraction and Pattern Matching, Electronic Information and Communication Engineers" (D), vol. J80-D-II, No. 8, (1997) pp. 2170-2177.

(Continued)

*Primary Examiner*—Samir Ahmed
*Assistant Examiner*—Charles Kim
(74) *Attorney, Agent, or Firm*—Pillsbury Winthrop Shaw Pittman LLP (57) ABSTRACT

A face image recognition apparatus includes a registration information holding section in which a reference feature amount of the face of at least one to-be-recognized person is previously registered, the feature amount of the face is extracted from a face image input via an image input section by use of feature amount extracting section, a recognition section determines the recognition rate between the extracted feature amount and the reference feature amount registered in the registration information holding section, and a feature amount adding section additionally registers the feature amount extracted by the feature amount extracting section as a new reference feature amount into the registration information holding section when it is determined that the determined recognition rate is lower than a preset value.

3 Claims, 4 Drawing Sheets

OTHER PUBLICATIONS

Ken-ichi Maeda et al., "A Pattern Matching Method with Local Structure", Electronic Information and Communication Engineers(D), vol. J68-D, No. 3, (1985), pp. 345-352.

Search Report, dated Apr. 6, 2004, from the European Patent Office for Patent Application No. 02005068.8-1224-.
Background Art Information.
Translation of the Background Art Information (Japanese text portions only).

FACE IMAGE RECOGNITION APPARATUS

CROSS-REFERENCE TO RELATED APPLICATIONS

This application is based upon and claims the benefit of priority from the prior Japanese Patent Application No. 2001-067235, filed Mar. 9, 2001, the entire contents of which are incorporated herein by reference.

BACKGROUND OF THE INVENTION

1. Field of the Invention

This invention relates to a face image recognition apparatus which recognizes the face image of a person for security management or the like and a passage control apparatus which controls passage of a passer by use of the face image recognition apparatus.

2. Description of the Related Art

Conventionally, in the face image recognition apparatus, a face image obtained by photographing the face of a person is collated with previously registered face images to perform the face image recognition process. However, in the face image recognition apparatus, the person recognition rate is lowered by factors such as a variation in the face itself, for example, a variation in the hair style, beard or makeup or the presence or absence of glasses, or a variation in the face image due to a variation in the standing position of the person.

A method for suppressing a lowering in the person recognition rate is proposed in Jpn. Pat. Appln. KOKAI Publication No. 11-167632. In Jpn. Pat. Appln. KOKAI Publication No. 11-167632, a method for re-registering the face image when the person recognition rate is lowered to some extent is disclosed. Further, in Jpn. Pat. Appln. KOKAI Publication No. 11-167632, a method for registering a new reference feature amount obtained by combining a reference feature amount for each face image of each of persons previously registered with a feature amount obtained from a photographed (input) face image is disclosed.

In Jpn. Pat. Appln. KOKAI Publication No. 11-167632, if the person recognition rate is lowered, that is, if the similarity between the feature amount obtained from an input image and each of reference feature amounts previously registered is lowered, a reference feature amount is newly registered or re-registered by use of the input image. For example, each time a person who changes his hair style every day is recognized, registration information (reference feature amount) is updated or newly registered. By repeating the above re-registration or new registration, there occurs a possibility that no difference is made between the registration information of each person and that of another person. As a result, the recognition rate may be lowered.

BRIEF SUMMARY OF THE INVENTION

Accordingly, an object of this invention is to provide a face image recognition apparatus, face image recognition method and passage control apparatus which can alleviate a lowering in the person recognition rate due to a variation in the face image caused by a variation in the standing position of a person and a variation in the face itself and recognize the face image with high precision.

A face image recognition apparatus of this invention comprises a memory in which a reference feature amount of a face of at least one to-be-recognized person is previously registered, an image input section which inputs a face image of a person, a feature amount extracting section which extracts a feature amount of a face based on the face image input by the image input section, a recognition section which determines a recognition rate between the feature amount extracted by the feature amount extracting section and the feature amount registered in the memory, and a feature amount adding section which additionally registers the feature amount extracted by the feature amount extracting section as a new reference feature amount into the memory when the recognition rate determined by the recognition section is lower than a preset value.

A passage control apparatus of this invention which recognizes a face image of a passer and controls the passage of the passer, comprises a memory in which a reference feature amount of a face of at least one person who is permitted to pass through is previously registered, an image input section which inputs a face image of a passer, a feature amount extracting section which extracts a feature amount of a face based on the face image of the passer input by the image input section, a recognition section which determines a recognition rate between the feature amount extracted by the feature amount extracting section and the feature amount registered in the memory, a passage control section which controls the passage of the passer based on the recognition rate determined by the recognition section, and a feature amount adding section which additionally registers the feature amount extracted by the feature amount extracting section as a new reference feature amount into the memory when the recognition rate determined by the recognition section is lower than a preset value.

A face image recognition method of this invention used in a face image recognition apparatus including a memory in which a reference feature amount of a face of at least one to-be-recognized person is previously registered, comprises inputting a face image of a person, extracting a feature amount of a face based on the input face image, determining a recognition rate between the extracted feature amount and the feature amount registered in the memory, and additionally registering the feature amount extracted from the input face image as a new reference feature amount into the memory when the determined recognition rate is lower than a preset value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described embodiments of this invention with reference to the accompanying drawings.

First, a first embodiment is explained.

Figure 1:
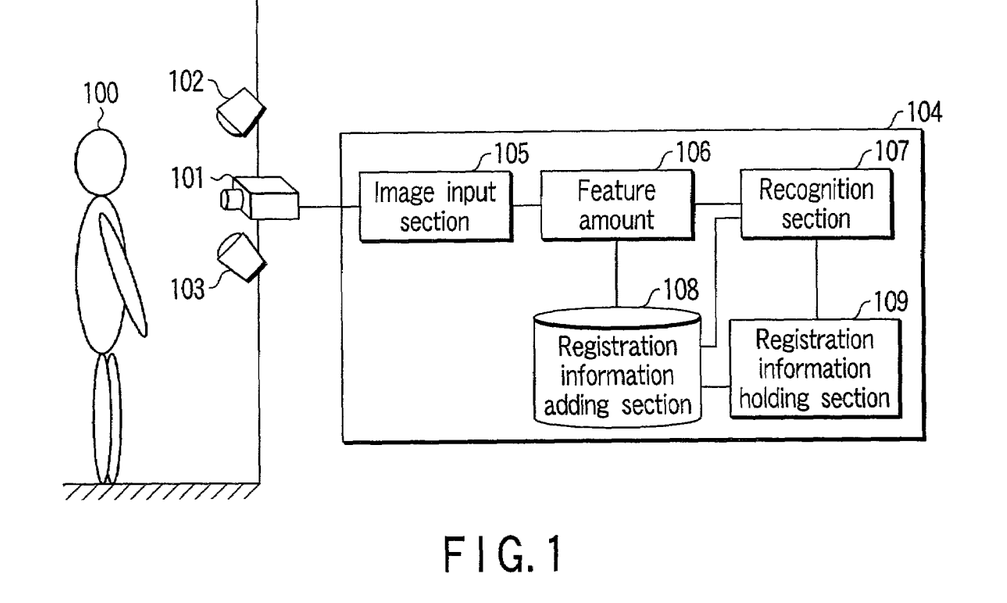
FIG. 1 is a configuration diagram schematically showing the configuration of a face image recognition apparatus according to a first embodiment of this invention.

FIG. 1 schematically shows the configuration of a face image recognition apparatus according to a first embodiment of this invention. The face image recognition apparatus includes a camera 101, first illuminating section 102, second illuminating section 103 and processing section 104.

The camera 101 is image input means for photographing and inputting a face image of a to-be-recognized person 100. For example, the camera 101 is configured by a television camera using an imaging device such as a CCD sensor.

The first illuminating section 102 is first illuminating means for applying light toward the to-be-recognized person 100 with constant illuminance in an oblique direction from the upper right position or upper left position of the camera 101. The second illuminating section 103 is second illuminating means for applying light toward the to-be-recognized person 100 with constant illuminance in an oblique direction from below the camera 101. The first illuminating section 102 and second illuminating section 103 are each configured by a lighting unit such as a fluorescent light which applies light with constant illuminance. The processing section 104 processes a face image input from the camera 101 and performs the recognition process.

Next, the first illuminating section 102 and second illuminating section 103 are explained.

Figure 2:
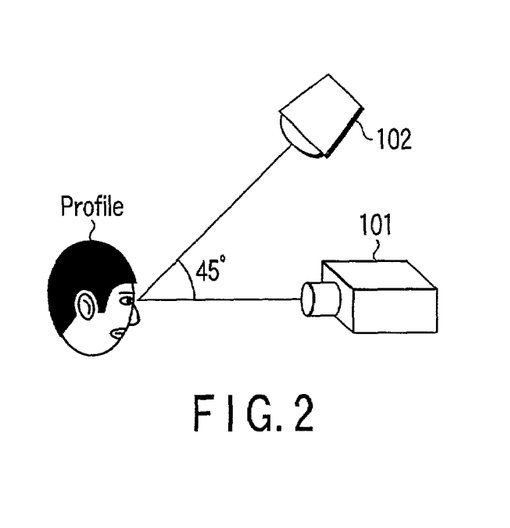
FIG. 2 is a side view showing the relation between a first illuminating section and a camera.
Figure 3:
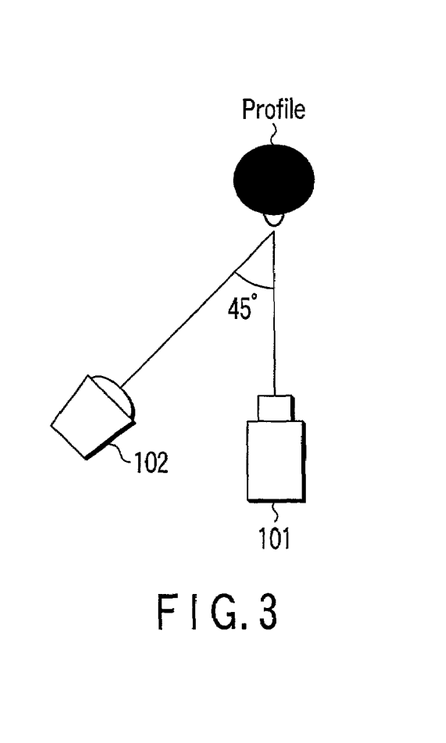
FIG. 3 is a top view showing the relation between the first illuminating section and the camera.
Figure 4:
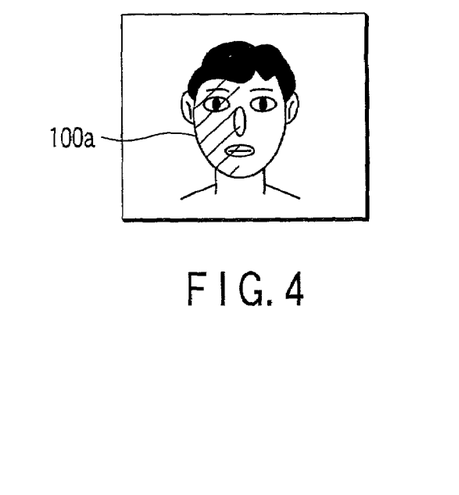
FIG. 4 is a view showing an example of a face image to be photographed by use of the first illuminating section.

As shown in FIGS. 2 and 3, the first illuminating section 102 is disposed to make an angle of 45° between the optical axis of the first illuminating section 102 and the optical axis of the camera 101, but it may be disposed in a condition that the angle is 30° or less, for example. The first illuminating section 102 forms the shadows of portions of the face (such as a nose and eyes) on the half portion of the face (hatched portion 100a of FIG. 4) by applying direct light toward the face of the to-be-recognized person 100 as shown in FIG. 4. In this case, diffusion light or indirect light can be used instead of the direct light and the same effect can be attained if the shadow can be made on the half portion of the face.

Figure 5:
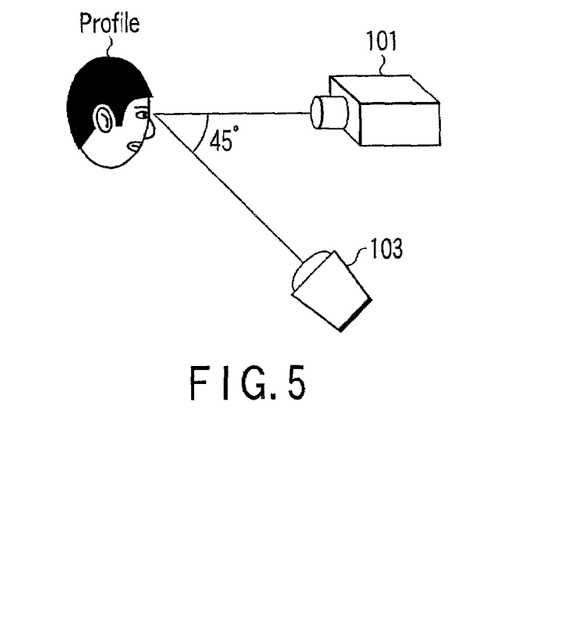
FIG. 5 is a side view showing the relation between a second illuminating section and the camera.

As shown in FIG. 5, the second illuminating section 103 is disposed to make an angle of 45° between the optical axis of the second illuminating section 103 and the optical axis of the camera 101, but it may be disposed in a condition that the angle is not less than 30° and not larger than 60°, for example. It is sufficient only if the second illuminating section 103 applies direct light toward the face of the to-be-recognized person 100. In this case, diffusion light or indirect light can be used instead of the direct light.

Next, the relation between the first illuminating section 102 and the second illuminating section 103 is explained.

It is required for the first illuminating section 102 and second illuminating section 103 to emit the same type of light. Further, it is required that the relation between the illuminance 1A of the first illuminating section 102 and the illuminance 2A of the second illuminating section 103 satisfy the following expression (1).

$$1A \geq 2A \quad (1)$$

A shadow is formed on the face of the to-be-photographed person by use of the two illuminating sections (first illuminating section 102, second illuminating section 103). Uneven portions of the face are emphasized by the shadow. Thus, by emphasizing the uneven portions of the face, the difference between individuals is emphasized to enhance the recognition rate. Particularly, the first illuminating section 102 forms the shadow on the half portion of the face image of the to-be-recognized person 100. The shadow on the half portion of the face image satisfactorily expresses information of the uneven portions of the face to emphasize the difference between individuals.

The second illuminating section 103 suppresses the influence by the first illuminating section 102 so that the first illuminating section 102 will not make an excessively strong shadow on the face of the to-be-recognized person 100. If only the first illuminating section 102 is used, the way of forming a shadow on the face is considerably different at the recognition time and at the registration time according to a variation in the distance between the to-be-recognized person 100 and the camera 101. A variation in the shadow of the face due to a difference in the distance between the to-be-recognized person 100 and the camera 101 can be suppressed by light from the second illuminating section 103. As a result, a lowering in the recognition rate due to a difference in the distance between the to-be-recognized person 100 and the camera 101 can be suppressed.

Assume now that the total value of the illuminance 1A of the first illuminating section 102 and the illuminance 2A of the second illuminating section 103 which illuminate the face of the to-be-recognized person 100 is B lux (lx) and the illuminance by external light which is applied to the face of the to-be-recognized person 100 when the first illuminating section 102 and second illuminating section 103 are used is C lux (lx). In this case, if the following expression (2) is established, the influence by external light can be suppressed.

$$1A + 2A = B > C \quad (2)$$

For example, the influence by a ceiling light such as a fluorescent light which lies in the upper rear position of the to-be-recognized person 100 can be suppressed by causing the relation of the above expression (2) to be established.

Further, the total illumination B (lx) of the first illuminating section 102 and second illuminating section 103 is defined in a range so as to prevent the input face image from being set into the saturated state.

In the present embodiment, it is assumed that the first illuminating section 102 and second illuminating section 103 are always set in the ON state, but it is also possible to turn ON the first illuminating section 102 and second illuminating section 103 only when the to-be-recognized person 100 comes near the present apparatus. This can be made possible by additionally providing a sensor (for example, a human sensor such as an infrared sensor) which senses whether the to-be-recognized person 100 comes near the present apparatus. Further, it is possible to sense a human who comes near the present apparatus by use of an input image photographed by the camera 101.

Next, the processing section 104 is explained.

The processing section 104 is configured by a computer, for example. The processing section 104 is operated based on a control program stored in a storage medium such as a hard disk drive, optical disk, magneto-optical disk or FD.

In the following explanation, various information items including image input data, extracted feature amount, partial space, inherent vector configuring a partial space, correlation matrix, status information such as time, date and location of registration, individual information such as a password number, ID code are used. Further, if "recognition data" is used, it includes a partial space or an inherent vector configuring a partial space. If "registration information" is used, it contains image input data, extracted feature amount, partial space, inherent vector configuring a partial space, correlation matrix, status information and individual information. Therefore, the recognition data is contained in the registration information.

An example of the concrete configuration of the processing section 104 is explained in detail with reference to FIG. 1.

The processing section 104 includes an image input section 105 used as image input means, a feature amount extracting section 106 used as feature amount extracting means, a recognition section 107 used as recognition means, a registration information holding section 108 used as feature amount registration means (memory), and a registration information adding section 109 used as feature amount adding means (feature amount adding section).

The image input section 105 is supplied with a face image from the camera 101. The image input section 105 A/D-converts the face image from the camera 101 into a digital form and then supplies the digital face image to the feature amount extracting section 106.

Figure 6:
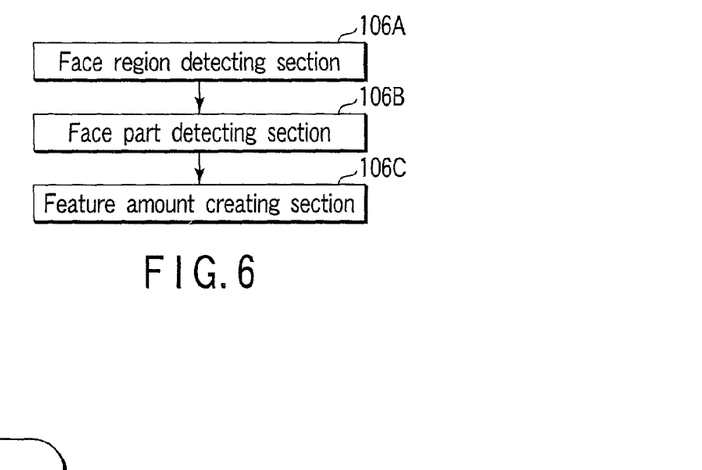
FIG. 6 is a block diagram schematically showing the configuration of a feature amount extracting section.

The feature amount extracting section 106 extracts a feature amount such as light and shade information or partial space information by use of the face image supplied from the image input section 105. For example, as shown in FIG. 6, the feature amount extracting section 106 includes a face region detecting section 106A, face part detecting section 106B and feature amount creating section 106C.

The face region detecting section 106A detects a face region based on a face image input from the camera 101. For example, the detection method of the face region in the face region detecting section 106A is to derive correlation values while moving a previously prepared template in the image and determine a location having the largest correlation value as a face region. The face region detecting method can be attained by use of a face region extracting method by utilizing a subspace method or an inherent space method.

The face part detecting section 106B detects the positions of the nose and eyes from portions of the detected face region. For example, as the face part detecting method, a method disclosed in a document ("Face Feature Point Extraction by Combination of Shape extraction and Pattern Collation" by Kazuhiro Fukui, Osamu Yamaguchi, Study Papers of Institute of Electronic Information and communication Engineers (D), vol. J80-D-II, No. 8, pp. 2170 to 2177 (1997)) may be used.

The feature amount creating section 106C extracts a face region of a preset size and shape based on the position of the detected face parts and uses light and shade information as a feature amount. In this case, for example, the light and shade value of a region of m pixels×n pixels is used as it is as information and information of m×n dimension is used as a feature vector.

Further, in a case where the mutual subspace method is used in the recognition section 107, the feature amount is created by the following procedure. The mutual subspace method is a known recognition method described in a document ("A Pattern Matching Method With Local Structure" by Kenichi Maeda and Sadaichi Watanabe, Study Papers of THE INSTITUTE OF ELECTRONIC, INFORMATION AND COMMUNICATION ENGINEERS (D), vol. J68-D, No. 3, pp. 345 to 352 (1985)), for example.

When the mutual subspace method is used as a recognition method, the feature amount creating section 106C first derives information of m×n dimension as a feature vector. After the feature vector is derived, the feature amount creating section 106C derives a correlation matrix (or covariance matrix) of the feature vector. After the correlation matrix of the feature vector is derived, the feature amount creating section 106C calculates a partial space by deriving a normal orthogonal vector by use of K-L expansion with respect to the correlation matrix of the feature vector. The partial space is expressed by selecting k inherent vectors corresponding to inherent values in an order from the largest inherent value and using the set of inherent vectors.

In the present embodiment, the feature amount creating section 106C derives a correlation matrix Cd from the feature vector and derives a matrix Φ of the inherent vectors by diagonalizing the correlation matrix expressed as follows.

$$Cd = \Phi d A d \Phi dT \tag{3}$$

For example, the feature amount creating section 106C derives the correlation matrix of the feature vector based on time series face image data obtained from the input image and derives the normal orthogonal vector by use of the K-L expansion in order to calculate the partial space. The partial space is utilized as a recognition dictionary which is used to identify a person. For example, the partial space which is previously registered together with individual information may be used as a dictionary.

Further, as will be described later, the partial space may be used as input data which is used to recognize the partial space itself. Therefore, the calculation result of the partial space is supplied to the recognition section 107 and registration information holding section 108.

The recognition section 107 performs a collation (comparison) process for collating (comparing) recognition data items (partial spaces) stored in the registration information holding section 108 with a feature amount (light and shade information or partial space information) obtained in the feature amount extracting section 106. The recognition section 107 determines (recognizes) who a to-be-recognized person 100 photographed by the camera 101 is or determines (authenticates or identifies) whether the person is a corresponding (or interested) person or not based on the result of the collation process. The recognition section 107 determines data of a person whose face is most similar to the photographed face image when it performs a recognition process of a person. For example, a person corresponding to data having the largest one of the similarities between the data items and the photographed face image may be determined as the recognition result.

Further, when the recognition section 107 performs the identification process (authentication process) of a person, it determines whether or not the person is a person corresponding to personal or individual information by use of the individual information of a card, registration number or key. For example, the recognition section 107 calculates the similarity between recognition data corresponding to individual information given by a to-be-authenticated person and the photographed face image and determines that the person is a corresponding person if the calculated similarity exceeds a preset threshold value.

When the recognition section 107 performs the identification process, it is necessary to use means for inputting data of a card, registration number, key or the like. For example, as the card, an IC card, ID card or radio cad can be used and a card reader for the card used is provided on the present apparatus. Further, if the registration number or password is used, key input means for inputting the number is provided on the present apparatus.

As the recognition method used in the recognition section 107, a subspace method, multiple similarity method or the like is used if information of the feature amount extracting section 106 is used.

Now, a case wherein the mutual subspace method is used is explained. In this method, recognition data (registration data) in previously stored registration information and data (input data) input are each expressed as a partial space. Further, an "angle" made by the two partial spaces is defined as the similarity and a partial space input is defined as an input partial space.

In the mutual subspace method, a correlation matrix Cin expressed by the following equation [Eq 2] is derived with respect to an input data string and an inherent vector Φin is derived by diagonalizing the correlation matrix.

$$Cin = \Phi in \, Ain \, \Phi inT \quad (4)$$

Then, the partial space similarity (0.0 to 1.0) between two partial spaces expressed by Φin and Φd is derived and used as the similarity for recognition.

Figure 7:
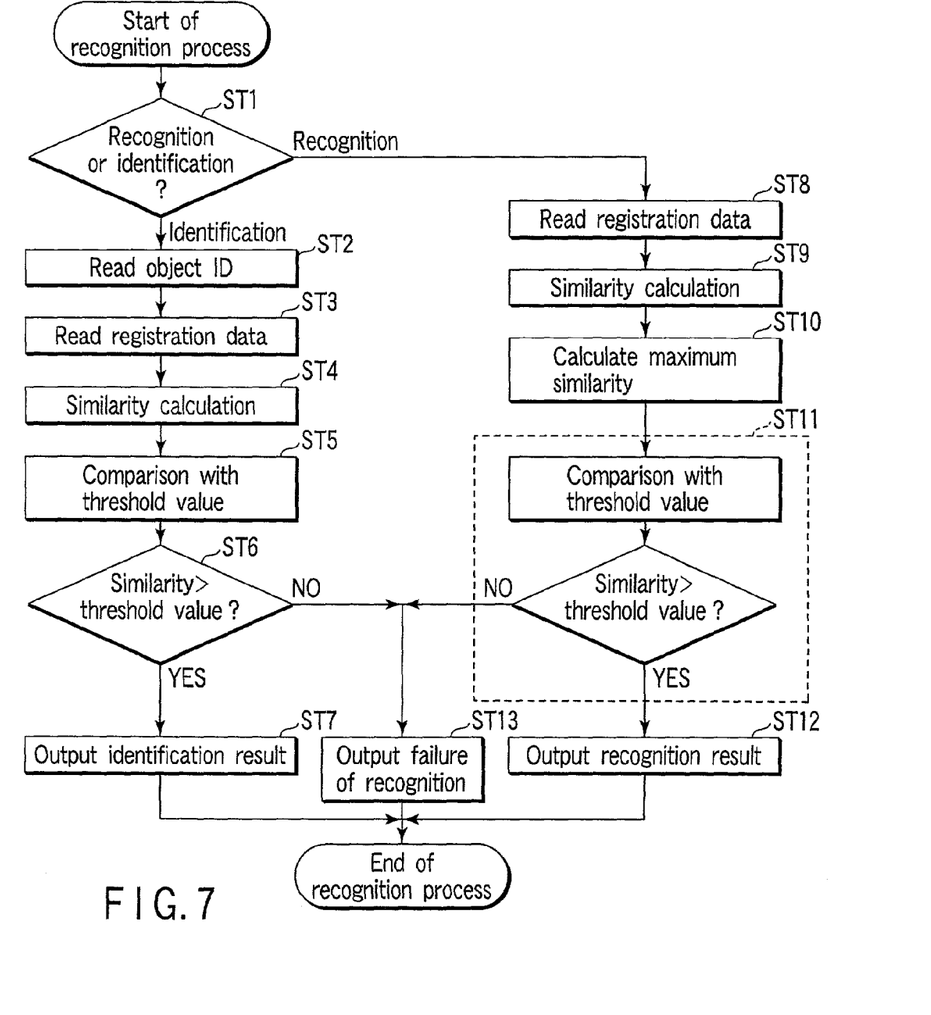
FIG. 7 is a flowchart for illustrating the recognition process of a recognition section.

The recognition section 107 is operated as shown in the flowchart of FIG. 7. First, the operation of the recognition section 107 is different depending on whether it performs the recognition process or the identification process (step ST1). If the identification process is performed, an ID code used as individual information of a to-be-recognized person is read (step ST2). Then, registration information (partial space) corresponding to the ID code is read out from the registration information holding section 108 (step ST3).

Next, as described above, in order to perform the recognition process by use of the subspace method or the like, the similarity between the partial space of each registration information and an input vector (inherent vector from the feature amount extracting section 106) or input partial space is calculated (step ST4). Then, the similarity is compared with a preset threshold value (steps ST5, ST6) and the result of identification is output (step ST7).

In a case where the recognition process is performed, data items corresponding to to-be-recognized objects are all read out from the registration information holding section 108 (step ST8). Then, the similarities with the respective registration information items are calculated (step ST9). Next, the maximum similarity among the calculated similarities is selected (step ST10) and output as the result of recognition (step ST12).

In this case, it is also possible for the recognition section 107 to determine whether the recognition result is correct or not by comparing the maximum similarity with the threshold value as shown by the step ST11 surrounded by broken lines in FIG. 7 (step ST13). For example, if the degree of similarity is excessively low, the recognition section 107 can determine that the recognition result does not correspond to any one of the to-be-recognized objects.

Next, the registration information holding section 108 is explained.

The registration information holding section 108 can store status information such as time, date and location of the registration and partial spaces (or correlation matrices) used to identify a to-be-recognized object. It is also possible to store image input data or extracted feature amounts in the registration information holding section 108.

In the present embodiment, not only a case wherein partial spaces are held, but also a case wherein correlation matrices used in the preceding stage to calculate partial spaces are held is explained.

The registration information holding section 108 holds one or a plurality of recognition data items for each person or ID code. The partial space is stored together with attendant information such as time at which it is acquired.

Next, the registration information adding section 109 is explained.

If the recognition rate in the recognition section 107 becomes lower than a preset value, the registration information adding section 109 detects this state and performs a process for additionally registering recognition data (feature amount) obtained from the face image input at this time as new recognition data (reference feature amount) into the registration information holding section 108.

First, the registration information adding section 109 detects whether the recognition rate in the recognition section 107 becomes lower than a preset value or not. For example, the registration information adding section 109 detects that the degree of similarity calculated in the recognition section 107 becomes lower than a determining reference value. If the registration information adding section 109 detects that the degree of similarity calculated in the recognition section 107 becomes lower than the determining reference value, the registration information adding section 109 additionally registers the feature amount extracted by the feature amount extracting section 106 at this time as a new reference feature amount into the registration information holding section 108.

As the criterion for a lowering in the similarity, a recognition data addition determining level (reference value for addition determining) is previously set. Therefore, the registration information adding section 109 compares the addition determining reference value with the similarity calculated by the recognition section 107 and if the similarity calculated by the recognition section 107 is smaller than the addition determining reference value, it determines that it is necessary to add recognition data (reference feature amount).

It is assumed necessary for the relation between the recognition data addition determining level (Ladd) and the recognition threshold (Lrec) in the recognition section 107 to satisfy the following expression (5).

$$Ladd \leq Lrec \quad (5)$$

Further, as described before, in the recognition section 107, the registration information (reference feature amount) read out from the registration information holding section 108 is collated with the input feature amount to calculate the similarity between the two feature amounts. If a new reference feature amount is additionally registered by the registration information adding section 109, the recognition section 107 reads out only the newly registered information (new reference feature amount) additionally registered from the registration information holding section 108 to calculate the similarity. That is, in the recognition section 107, a process of collation with registration information (old registration information) before additional registration is made is not performed.

In the recognition section 107, if the registration information adding section 109 detects that the degree of similarity (Sn) calculated by use of the new registration information (new reference feature amount) additionally registered becomes lower than the determining reference value (Ladd), it calculates similarity (So) in the same manner as described above by using registration information (old registration information) before the new registration information is additionally registered instead of the new registration information.

Next, the registration information adding section 109 compares the calculated similarity (So) with a preset determining reference value (Lnadd). As the result of comparison, if it is detected that the calculated similarity (So) is smaller than the preset determining reference value (Lnadd), the registration information adding section 109 additionally registers a feature amount extracted at this time from the feature amount extracting section 106 as a new reference feature amount into the registration information holding section 108 and deletes the registration information additionally registered in the preceding cycle.

Further, if the calculated similarity (So) is not smaller than the preset determining reference value (Lnadd), a process for additionally registering the new reference feature amount as described above is not performed. After this, in the recognition section 107, registration information (reference feature amount) corresponding to an object ID code is read out from the registration information holding section 108 and collated with an input feature amount to calculate the similarity between the two feature amounts. At this time, the registration information used as the reference feature amount is new registration information (new reference feature amount) additionally registered.

It is necessary for the relation between the determining reference value (Lnadd) and the recognition threshold value (Lrec) in the recognition section 107 to satisfy the following expression (6).

$$Lnadd \geq Lrec \times m \tag{6}$$

where m indicates a given number (for example, a value in a range of 0.8 to 1.0).

Thus, if a plurality of reference feature amounts are held, a plurality of partial spaces corresponding to one person can be simultaneously supplied to the recognition section 107 to perform the recognition process. Therefore, a lowering in the similarity caused by a variation in the face itself, for example, a variation in the hair style, beard or makeup or the presence or absence of glasses, or a variation in the face image due to a variation in the standing position of the person can be suppressed.

Next, the operation for adding the reference feature amount into the registration information holding section 108 is explained.

Figure 8:
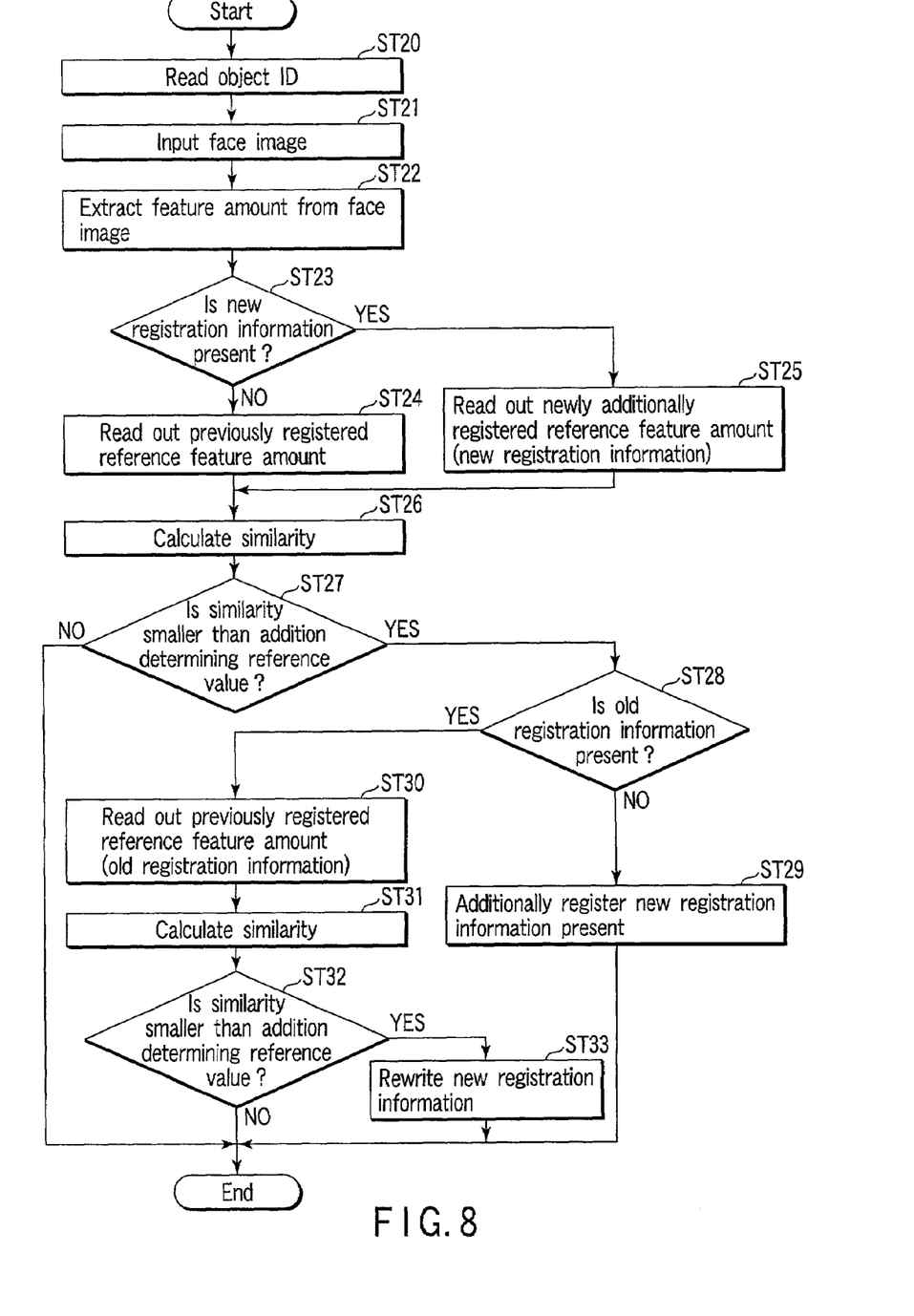
FIG. 8 is a flowchart for illustrating the adding operation of a reference feature amount.

FIG. 8 is a flowchart for illustrating the adding operation of the reference feature amount. The adding operation of the reference feature amount is applied to the identification process. As shown in FIG. 8, an ID code used as individual information of a to-be-recognized person is read (step ST20). Then, when the face image of a person is photographed by use of the camera 101, the photographed face image is input to the image input section 105 (step ST21). The image input section 105 A/D-converts the face image and supplies the digital face image to the feature amount extracting section 106. The feature amount extracting section 106 extracts a feature amount from the face image supplied from the image input section 105 (step ST22).

When the feature amount extracting section 106 extracts the feature amount from the face image, the recognition section 107 determines whether a new reference feature amount (new registration information) additionally registered in the registration information holding section 108 is present or not (step ST23). If it is determined in the above determination process that the registration information additionally registered is not present, the recognition section 107 reads out a previously registered reference feature amount from the registration information holding section 108 (step ST24). Further, if it is determined in the above determination process that the new registration information is present, the recognition section 107 reads out the new reference feature amount (new registration information) additionally registered (step ST25). If the reference feature amount is read out from the registration information holding section 108 in the step ST24 or ST25, the recognition section 107 collates the readout reference feature amount with the feature amount extracted by the feature amount extracting section 106 to calculate a recognition rate (similarity) (step ST26).

Thus, if the similarity is calculated, the recognition section 107 determines whether or not the similarity is smaller than the preset addition determining reference value (step ST27). The above determination process can be performed by the registration information adding section 109.

If it is determined in the above determining process that the similarity is not smaller than the preset addition determining reference value ("NO" in the step ST27), the registration information adding section 109 does not perform the additional registration process of the feature amount.

Further, if it is determined in the above determining process that the similarity is smaller than the preset addition determining reference value ("YES" in the step ST27), the recognition section 107 determines whether or not old registration information which has not been read out in the step ST25 is present (step ST28). If it is determined in the above determining process that old registration information is not present ("NO" in the step ST28), the registration information adding section 109 additionally registers the feature amount of a face extracted by the feature amount extracting section 106 as a new reference feature amount into the registration information holding section 108 (step ST29).

If it is determined in the above determining process that old registration information is present ("YES" in the step ST28), the recognition section 107 reads out the old registration information from the registration information holding section 108 (step ST30) and calculates the similarity thereof with the feature amount extracted by the feature amount extracting section 106 (step ST31). If the similarity with the old registration information is calculated, the recognition section 107 determines whether or not the similarity calculated based on the old registration information is smaller than a preset addition determining reference value (step ST32).

If it is determined in the above determining process that the similarity is not smaller than the preset addition determining reference value ("NO" in the step ST32), the registration information adding section 109 does not perform the process for additional registration of the feature amount.

Further, if it is determined in the above determining process that the similarity is smaller than the preset addition determining reference value ("YES" in the step ST32), the registration information adding section 109 rewrites the new registration information registered in the registration information holding section 108 by using the feature amount of a face extracted by the feature amount extracting section 106 as a new reference feature amount (step ST33). That is, if both of the similarity with the new registration information and the similarity with the old registration information are smaller than the addition determining reference value, the registration information adding section 109 deletes the new registration information which is already registered, and at the same time, additionally registers the feature amount extracted by the feature amount extracting section 106 as a new reference feature amount (new registration information).

Thus, when the new registration information is rewritten, the old registration information is held as it is. This is because the old registration information is a feature amount registered by use of a preset registration procedure and is highly worth holding and the new registration information is a feature amount extracted in the course of the recognition process and is less worth holding.

As described above, according to the first embodiment, a face image recognition apparatus and face image recognition method in which a lowering in the person recognition rate caused by a variation in the face itself or a variation in the face image due to a variation in the standing position of the person can be suppressed and which can recognize a face image with high precision can be provided.

Next, a second embodiment is explained.

The second embodiment is an example in which the face image recognition apparatus explained in the first embodiment is applied to a passage control apparatus which recognizes the face image of a passer and controls the passage of the passer.

Figure 9:
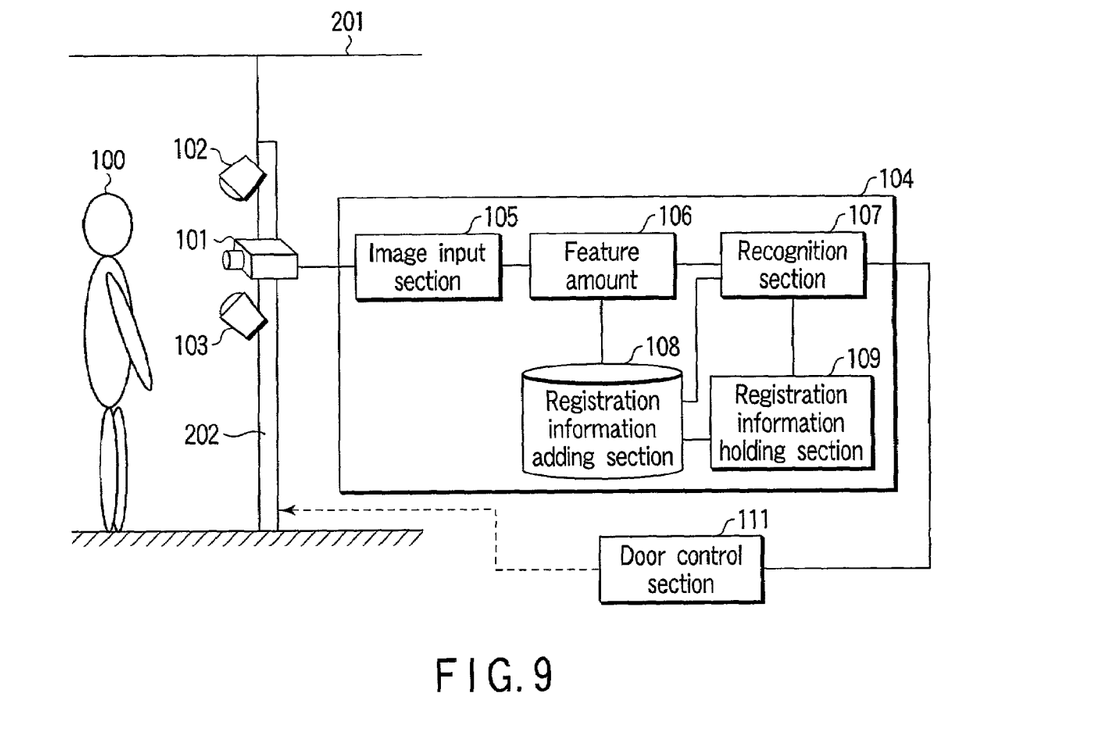
FIG. 9 is a configuration diagram schematically showing the configuration of a passage control apparatus according to a second embodiment of this invention.

FIG. 9 schematically shows the configuration of the passage control apparatus according to the second embodiment. For example, the passage control apparatus manages entrance or exit into or from an important facility, recognizes the face image of the user (passer) and opens or closes the door for entrance or exit into or from the important facility based on the recognition result. The passage control apparatus includes a camera 101, first illuminating section 102, second illuminating section 103, processing section 104 and door control section 111 which is used as passage control means for controlling the open/closed state of a door 202 for entrance/exit into or from an important facility (such as a room in which importance is attached to the security) 201 based on the recognition result of a recognition section 107.

In FIG. 9, since portions other than the door control section 111 are the same as those of the face image recognition apparatus of FIG. 1, the same reference numerals are attached to like portions and the explanation thereof is omitted.

For example, if it is determined in the step ST6 of FIG. 7 that the derived similarity is larger than the threshold value or it is determined in the step ST11 that the derived similarity is larger than the threshold value, the recognition apparatus 107 outputs a signal of "open the door" to the door control section 111. On the other hand, if the derived similarity is smaller than the threshold value, the recognition apparatus 107 outputs a signal of "close the door" to the door control section 111.

When the door control section 111 receives the signal of "open the door" from the recognition section 107, it controls the door 202 for entrance/exit into the open state and permits a to-be-recognized person (in this case, a passer) 100 to enter the room. However, if it receives the signal of "close the door" from the recognition section 107, it holds the door 202 for entrance/exit in the closed state and inhibits the passer 100 from entering the room.

As described above, according to the second embodiment, a passage control apparatus in which a lowering in the person recognition rate caused by a variation in the face itself or a variation in the face image due to a variation in the standing position of the person can be suppressed by controlling the passage of the passer by use of the face image recognition apparatus explained in the first embodiment and which can recognize a face image with high precision can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A face image recognition apparatus comprising: a memory in which a reference feature amount of a face of a to-be-recognized person is previously registered and a new reference feature amount can be additionally registered,
    an image input section which inputs a face image of a person,
    feature amount extracting section which extracts a feature amount of a face based on the face image input by said image input section,
    a recognition section which performs a first determining process for determining a recognition rate between the feature amount extracted by said feature amount extracting section and the reference feature amount previously registered in said memory when a new reference feature amount is not additionally registered in said memory, performs a second determining process for determining a recognition rate between the feature amount extracted by said feature amount extracting section and a new reference feature amount additionally registered in said memory when the new reference feature amount is additionally registered in said memory, and performs a third determining process for determining the recognition rate between the feature amount extracted by said feature amount extracting section and the reference feature amount previously registered in said memory when the recognition rate determined by the second determining process is lower than a preset value, and
    a feature amount adding section which performs a first additional registration process for additionally registering the feature amount extracted by said feature amount extracting section as a new reference feature amount into said memory when the recognition rate determined by the first determining process of said recognition section is lower than a preset value and performs a second additional registration process for deleting the new reference feature amount which is already additionally registered in said memory and additionally registering the feature amount extracted by said feature amount extracting section as a new reference feature amount into said memory when the recognition rate determined by the second determining process of said recognition section is lower than a preset value and the recognition rate determined by the third determining process of said recognition section is lower than a preset value.

2. A passage control apparatus which recognizes a face image of a passer and controls the passage of the passer, comprising:

a memory in which a reference feature amount of a face of a person who is permitted to pass through is previously registered and a new reference feature amount of the face of the person who is permitted to pass through can be additionally registered, an image input section which inputs a face image of a person, a feature amount extracting section which extracts a feature amount of a face based on the face image of the passer input by said image input section, a recognition section which performs a first determining process for determining a recognition rate between the feature amount extracted by said feature amount extracting section and the reference feature amount previously registered in said memory when a new reference feature amount is not additionally registered in said memory, performs a second determining process for determining a recognition rate between the feature amount extracted by said feature amount extracting section and a new reference feature amount additionally registered in said memory when the new reference feature amount is additionally registered in said memory, and performs a third determining process for determining the recognition rate between the feature amount extracted by said feature amount extracting section and the reference feature amount previously registered in said memory when the recognition rate determined by the second determining process is lower than a preset value, and a feature amount adding section which performs a first additional registration process for additionally registering the feature amount extracted by said feature amount extracting section as a new reference feature amount into said memory when the recognition rate determined by the first determining process of said recognition section is lower than a preset value and performs a second additional registration process for deleting the new reference feature amount which is already additionally registered in said memory and additionally registering the feature amount extracted by said feature amount extracting section as a new reference feature amount into said memory when the recognition rate determined by the second determining process of said recognition section is lower than a preset value and the recognition rate determined by the third determining process of said recognition section is lower than a preset value.

3. A face image recognition method used in a face image recognition apparatus including a memory in which a reference feature amount of a face of a to-be-recognized person is previously registered and a new reference feature amount can be additionally registered, comprising:

inputting a face image of a person, extracting a feature amount of a face based on the input face image, determining a recognition rate between the feature amount extracted by the feature amount extracting section and the reference feature amount previously registered in the memory when a new reference feature amount is not additionally registered in the memory, additionally registering the feature amount extracted from the input face image as a new reference feature amount into the memory when it is determined in said determining step that the recognition rate between the feature amount extracted from the input face image and the reference feature amount previously registered in the memory is lower than a preset value, determining a recognition rate between the feature amount extracted from the input face image and a new reference feature amount additionally registered in the memory when the new reference feature amount is additionally registered in the memory, determining the recognition rate between the feature amount extracted from the input face image and the reference feature amount previously registered in the memory when it is determined in said determining step that the recognition rate between the feature amount extracted from the input face image and the new reference feature amount additionally registered in the memory is lower than a preset value, and deleting the new reference feature amount which is already additionally registered in the memory and additionally registering the feature amount extracted from the input face image as a new reference feature amount into the memory when it is determined in said determining step that the recognition rate between the feature amount extracted from the input face image and the new reference feature amount additionally registered in the memory is lower than a preset value and the recognition rate between the feature amount extracted from the input face image and the reference feature amount previously registered in the memory is lower than a preset value.

* * * * *